June 7, 1960  W. J. BOBEK ET AL  2,939,740
VEHICLE SEAT CONSTRUCTION
Filed June 13, 1957  4 Sheets-Sheet 1

W.J. BOBEK
R. HAWVER
INVENTORS

BY E. C. McRae
J. R. Faulkner
J. H. Oster

ATTORNEYS

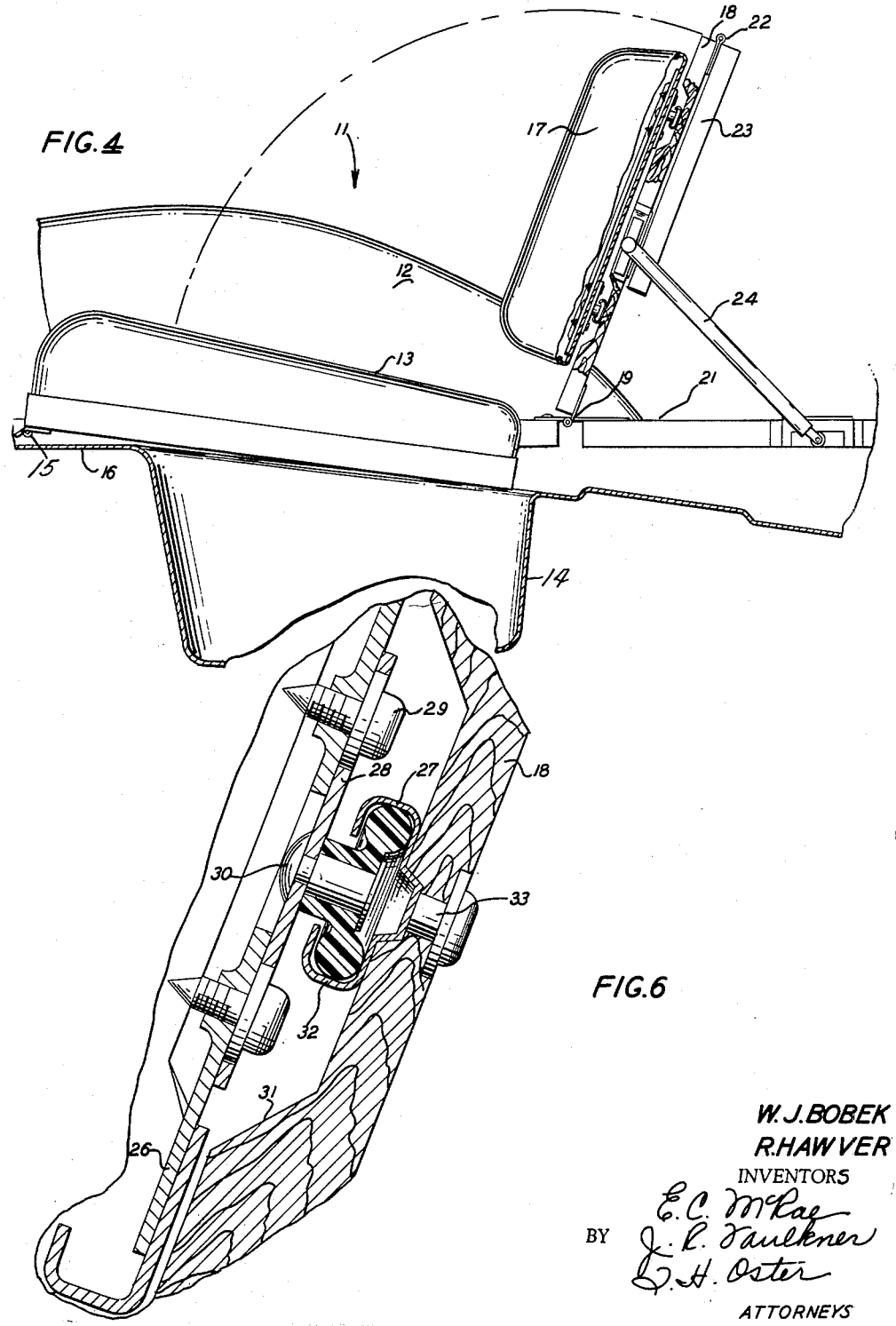

June 7, 1960

W. J. BOBEK ET AL 2,939,740

VEHICLE SEAT CONSTRUCTION

Filed June 13, 1957

W. J. BOBEK
R. HAWVER
INVENTORS

BY

ATTORNEYS

United States Patent Office 2,939,740
Patented June 7, 1960

2,939,740

VEHICLE SEAT CONSTRUCTION

William J. Bobek, Dearborn, and Roy Hawver, Pontiac, Mich., assignors to Ford Motor Company, Dearborn, Mich., a corporation of Delaware Filed June 13, 1957, Ser. No. 665,505

9 Claims. (Cl. 296—66)

This invention relates generally to a vehicle seat construction and more particularly to a seat of the folding type for a combined passenger and luggage carrying vehicle.

An object of the present invention is to provide a folding auxiliary seat for a combined passenger and luggage carrying vehicle such as a station wagon, in which a seat cushion and seat back of the auxiliary seat may be folded forwardly without removal into an appropriate recess in the floor pan and body to form a continuous luggage rack.

A further object is to provide a seat back cushion for the auxiliary seat of a station wagon in which the seat back is comprised of a pair of laterally movable cushions with a removable filler positioned in between.

Heretofore, it has been customary in some station wagons of the conventional type having a third or auxiliary seat to remove the seat back cushion and the seat cushion before the seat back could be collapsed to form a continuation of the luggage rack. The removal of these cushions is both annoying, time consuming and requires an outside of the vehicle storage place of some type.

In the present invention, the seat cushion is folded forwardly over the space between the second seat and the auxiliary seat while the seat back cushion is folded forwardly into the position originally occupied by the seat cushion. Because the wheel housings of the vehicle extend inwardly into the wagon passenger space, the seat back cushion width would be necessarily limited to that width which would permit storage between the wheel housings, this limited lateral width, however, is insufficient to provide adequate shoulder support for the normal complement of three passengers sitting in the auxiliary seat. In the applicants' novel construction, they have provided a seat back cushion arrangement of a split construction, and slidably mounted on transverse guides. In the upright passenger occupied position, the cushions are slidably moved toward the sides of the vehicle. A removable cushion filler, normally stored in the seat back cushion well when not in use, is placed between the cushion sections thus providing an enlarged seat back for the auxiliary seat passengers.

In transforming the auxiliary seat into a luggage rack, the seat cushion is pivoted forwardly over the foot well area between the second seat and the auxiliary seat. The filler section is then removed and stored either in the seat back cushion well or under the forwardly pivoted seat cushion in the foot well area. The seat back cushions are then slidably moved toward the center of the seat back. The seat back is then swung forwardly between the wheel housings and an auxiliary seat back extension hinged at its top to the seat back is folded forwardly thereof to extend to the folded seat cushion to form the continuous luggage rack. The auxiliary seat back extension may be omitted if the seat back is large enough to cover the space between the folded seat cushion and the rear luggage rack portion.

Other objects and advantages of this invention will be made more apparent as this description proceeds, particularly when considered in connection with the accompanying drawings, wherein:

Figure 4 is a side elevational view partly in section of the construction shown in Figure 1;

Figure 6 is an enlarged fragmentary view showing the slide arrangement of the seat back; and, Figure 7 is a side elevational view showing the filler cushion stored and the seat folded to form the luggage rack floor.

Figure 1:
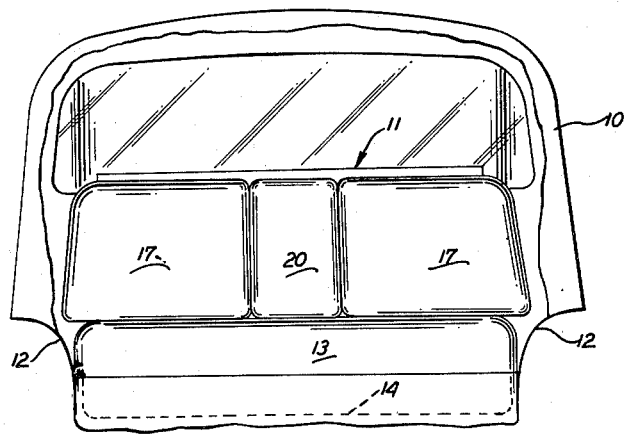
Figure 1 is a partial cross-sectional view of the rear portion of a station wagon embodying a seat construction made in accordance with the applicants' invention.
Figure 2:
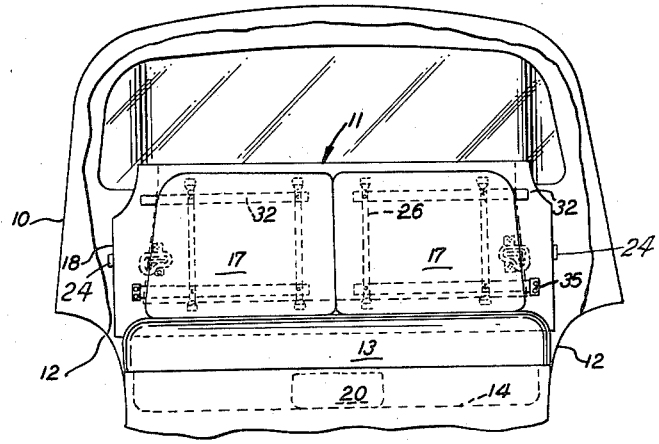
Figure 2 is a partial cross-sectional view similar to Figure 1 showing the filler cushion removed and stored in the seat back cushion well with the seat back cushions slidably moved toward the center of the seat back.

Referring now to the drawings, the rear portion of a station wagon type of vehicle is indicated at 10 having an auxiliary third seat 11 located in the rear thereof, and positioned between the wheel housings 12 of the vehicle. The seat portion comprises a transversely disposed cushion 13 hinged at its forward edge to hinge 15 which is pivotally mounted upon the floor pan 16. Cushion 13 is folded forwardly for storage in the foot well 25 between the second seat (not shown) and the auxiliary seat 11. The cushion 13 covers a transversely extending seat back cushion well 14 of the floor pan 16 in which the seat back cushions 17 are stored when the seat back 18 is folded forwardly about the hinge 19 mounted to the luggage rack floor 21.

Back 18 is secured against rearward movement by a pair of extensible arms 24 which are pivotally secured at their rearward ends to the luggage rack floor 21 and at their forward ends to the seat back 18. An additional hinge 22 is provided at the top of the seat back 18 to secure a transversely extending auxiliary seat back extension 23 which is normally held against the seat back 18 by a hinged mechanism shown in detail in Figure 5 and to be described later in full. Seat back extension 23 is narrower in width than the seat back 18 and does not interfere with the movement of the extensible arms 24.

The sliding seat back cushion arrangement is accomplished by providing a pair of vertical supports 26 rigidly secured to the reinforcement of the seat cushion 17. A nylon roller 27 is rotatably mounted on bearing 30 secured to bracket 28 which in turn is secured by a pair of screws 29 to the outer ends of the support 26. A total of four rollers are used with each seat back cushion 17, thus providing an effective arrangement for an upper and lower roller mounting.

Seat back 18 is provided with a pair of transverse parallel recesses 31 in which a pair of transversely extending guides 32 are secured by rivets 33. Rollers 27 are nested in the guides 32 respectively, and provide the slidable lateral movement to seat cushions 17.

Figure 3:
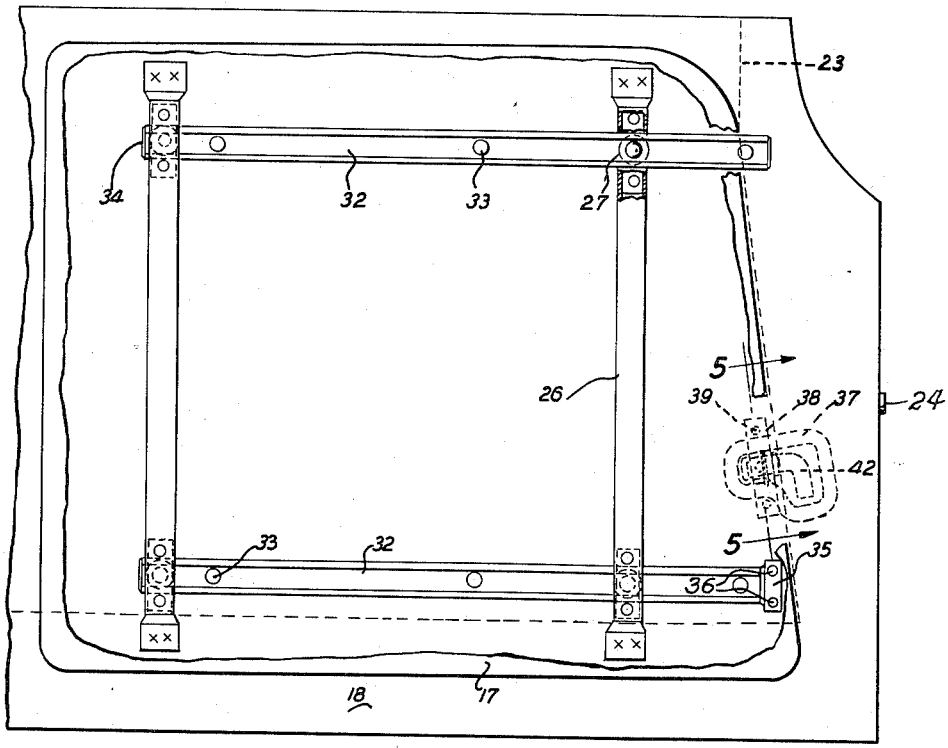
Figure 3 is an enlarged fragmentary plan view partly in section of the seat back construction shown in Figures 1 and 2.

In Figure 3, the details of the guide 32 construction are shown. The guides 32 at their innermost end are provided with a generally upstanding stop flange 34 which prevents the rollers 27 from rolling out of the guides and also serves to center the cushions 17 when they are to be stored in the seat back cushion well 14. Cushions 17 are restricted in their outermost position by a stop 35 secured to the back 18 by screws 36. As can be seen in the Figure 3, the stop 35 need be used only to restrict the opening of one of the guides 32 of each cushion mounting.

Figure 5:
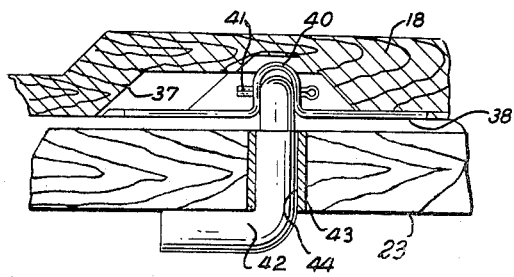
Figure 5 is a fragmentary cross-sectional view taken on the line indicated as 5—5 of Figure 3.
Figure 2:
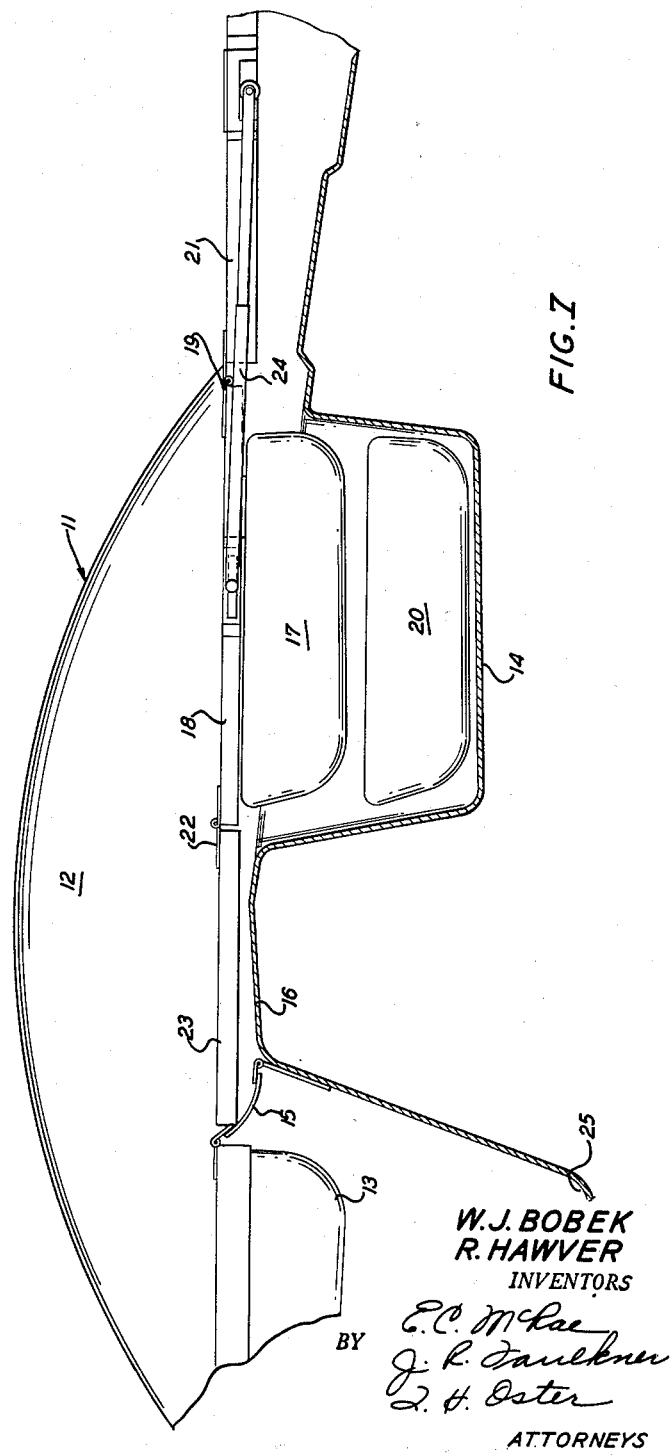

Figure 5 illustrates an arrangement used in holding the auxiliary seat back extension 23 against the seat back 18. An L-shaped recess 37 is provided in which an anchor plate 38 is positioned and secured by screws 39. Plate 38 is further provided with an L-shaped cavity 40 in which rod 42 is pivotally mounted on cotter key 41. When the seat back 18 has been folded to form the luggage rack, the rod 42 is nested in the cavity 40. When the seat back 18 is in the upright position shown in Figure 4, the rod 42 is pivoted outwardly and hooks the seat back 23 against the seat back 18 by its position in the edge receiving slot 43. A hardened bushing 44 may be used in the slot 43 to maintain the configuration of the slot.

It can thus be seen that a novel and unque foldable auxiliary rear seat arrangement is provided. The seat back cushions provide back and shoulder support for the effective width of the vehicle interior yet can be reduced in width substantially to allow for its storage in the floor pan of a vehicle.

It will be understood that the invention is not to be limited to the exact construction shown and described and that various changes and modifications may be made without departing from the spirit and scope of the invention, as defined in the appended claims.

What is claimed is:

1. An auxiliary seat back construction for a combined passenger and luggage carrying vehicle body structure having a forwardly foldable seat cushion, a storage compartment beneath said foldable seat cushion and a luggage rack floor comprising a seat back pivotally hinged to the vehicle body structure to cover said storage compartment when the seat back has been pivoted forwardly to form a part of the luggage rack floor of said vehicle body structure, a pair of seat back cushions, means slidably mounting said seat back cushions upon said seat back for movement laterally thereof from an inboard abutting position to an outboard position in which said seat back cushions have a space therebetween and extend partially beyond said seat back in the raised position of the latter, said seat back cushions when in laterally inboard abutting position being storable in said storage compartment when said seat back is pivoted forwardly to form a part of the luggage rack floor, and a removable filler cushion insertable in said space between said seat back cushions and supportable on said seat back when said seat back cushions are in their laterally outboard position.

2. An auxiliary seat construction for a combined passenger and luggage carrying vehicle body structure having a luggage rack floor portion, comprising a forwardly swingable seat cushion pivotally secured to the vehicle body structure, a seat back cushion storage compartment below the seat cushion when the seat cushion is in its normal passenger use position, a seat back pivotally secured to the vehicle body structure and swingable to cover the storage compartment when the seat cushion has been swung forwardly to form a part of the luggage rack floor, a pair of seat back cushions, guide means slidably mounting said seat back cushions upon said seat back for movement in a lateral plane, said seat back cushions extending outwardly beyond the seat back in their outermost position and being sufficiently restricted in width in their innermost position to be receivable in the storage compartment when the seat back has been swung forwardly to cover the storage compartment, and a removable filler cushion insertable between the cushions and supported by said seat back when said cushions are in their outermost position.

3. The structure defined by claim 2 which is further characterized in that said seat back cushion storage compartment comprises a depressed well below the luggage rack floor portion, said well being sufficient in size and depth to accommodate said seat back cushions and said removable filler cushion when the seat back has been pivoted forwardly to cover the storage compartment.

4. A self storing auxilary seat construction for a combined passenger and luggage carrying vehicle body structure, comprising a forwardly swingable seat cushion secured to the vehicle body structure, a seat well below said seat cushion when the seat cushion is in its passenger usable position, a seat back hinged at its lower edge to the vehicle body structure adjacent to the seat well for forward swinging movement in a covering position over the seat well after the seat cushion has been swingably moved, said seat back forming a part of the luggage rack floor when covering the seat well, a pair of seat back cushions, means for slidably mounting said seat back cushions upon said seat back for lateral movement thereof, said seat back cushions in their laterally inboard abutting position being receivable for storage within said seat well in the covering position of the seat back and in their laterally outboard apart position extending beyond the seat back, and a removable filler cushion interposed between said seat back cushions in their laterally outboard apart position and supported by said seat back thereby providing a continuous back support.

5. The structure defined by claim 4 which is further characterized in that the means for slidably mounting said seat back cushions includes at least one guide secured to said seat back, and at least one roller mounted to the seat back cushion, said roller engaging said guide for lateral movement relative to said seat back.

6. The structure defined by claim 4 which is further characterized in that the means for slidably mounting said seat back cushions comprises a pair of parallel guides rigidly secured to said seat back, a pair of vertical supports secured to said seat back cushions and having a roller rotatably mounted to said supports in spaced apart relationship for engagement with said guides, and limit means cooperative with said guides for restricting the lateral inboard and outboard movement respectively of said seat back cushion relative to said seat back.

7. The structure defined by claim 6 which is further characterized in that said limit means includes an upstanding flange on one end of one of the guides and a stop plate on the other end of the same guide, said upstanding flange defining the inboard position of the seat back cushion and said stop plate defining the outboard position of the seat back cushion.

8. A self-storing auxiliary seat construction for a combined passenger and luggage carrying vehicle body structure having a level luggage rack, comprising in combination a forwardly swingable seat cushion, a depressed seat well below the forward swingable seat cushion in its passenger carrying position, a seat back hinged to the body structure adjacent to the seat well and adapted to cover the seat well after the seat cushion has been moved to form a part of the luggage rack, a pair of seat back cushions, roller means for slidably mounting said seat back cushions upon the seat back including a pair of horizontally disposed tracks secured to the seat back for each cushion and a plurality of rollers mounted to the seat back cushion for engagement with the track, limit means on said seat back including an upstanding flange integral with one end of one of the tracks and a stop at the other end of the same track, said limit means defining the inboard and outboard lateral limits of the seat back cushions relative to the seat back, and a removable filler insertable between the cushions in their outboard position, said auxiliary seat construction being storable and providing a continuation of the luggage rack by first forwardly swinging said seat cushion then removing the filler and sliding the cushions to their inboard position and subsequently pivotally moving the seat back forwardly and covering the seat well, said cushions being receivable in the seat well only when said cushions are in their laterally inboard position.

9. The structure defined by claim 8 which is further characterized in that a seat back extension is provided hinged to the top of the seat back, and locking means secured to the seat back for holding the seat back extension to the seat back in the upright position including an anchor plate and an L-shaped rod pivotally mounted to the plate, an edge receiving slot in the extension aligned with the rod for releasably receiving said rod, said extension being forwardly movable about its hinge connection to provide a continuation of the luggage rack.

References Cited in the file of this patent

UNITED STATES PATENTS

| | | |
|---|---|---|
| 1,415,209 | Troke | May 9, 1922 |
| 2,493,806 | Dumas | Jan. 10, 1950 |
| 2,502,061 | Radford | Mar. 28, 1950 |
| 2,602,691 | Doty | July 8, 1952 |

FOREIGN PATENTS

| | | |
|---|---|---|
| 106,977 | Australia | Mar. 30, 1939 |